United States Patent [19]
Yung-Chow et al.

[11] Patent Number: 5,627,739
[45] Date of Patent: May 6, 1997

[54] REGULATED CHARGE PUMP WITH LOW NOISE ON THE WELL OF THE SUBSTRATE

[75] Inventors: Peng Yung-Chow; Jizoo Lin, both of Hsinchu, Taiwan

[73] Assignee: Winbond Electronics Corp., Hsinchu, Taiwan

[21] Appl. No.: 630,879

[22] Filed: Apr. 2, 1996

[51] Int. Cl.$^6$ .................................................. H02M 3/18
[52] U.S. Cl. ......................................... 363/60; 307/110
[58] Field of Search ...................... 363/59, 60; 307/110; 320/1

[56] References Cited

U.S. PATENT DOCUMENTS

| | | | |
|---|---|---|---|
| 4,106,086 | 8/1978 | Holbrook et al. | 363/60 |
| 5,392,205 | 2/1995 | Zavaleta | 363/59 |
| 5,397,931 | 3/1995 | Bayer | 363/59 X |
| 5,493,486 | 2/1996 | Connell et al. | 363/60 |

*Primary Examiner*—Peter S. Wong
*Assistant Examiner*—Y. J. Han

*Attorney, Agent, or Firm*—Meltzer, Lippe, Goldstein, et al.

[57] ABSTRACT

A regulated charge pump is provided to boost an amount of voltage while minimizing the well voltage fluctuation during the operation. The charge pump includes a charge pump core which has a first transistor, a second, a third transistor and an integration circuit. The first transistor has a first current electrode for receiving the first power supply voltage and a second current electrode coupled to the first terminal of the charging capacitor. The second transistor has a first current electrode coupled to a second terminal of the charging capacitor, a control electrode and a second electrode for receiving a second power supply voltage. The second transistor is proportionately conductive during the first predetermined time period. The third transistor has a first current electrode for receiving the first power supply voltage, and a second current electrode coupled to the second terminal of the charging capacitor. The third transistor is conductive during the second predetermined time period. The integration circuit is coupled to the control electrode of the second transistor, for changing the second voltage proportionately in response to an integration of a difference between a proportional voltage and a reference voltage by altering a conductivity of the second transistor.

4 Claims, 6 Drawing Sheets

REGULATED CHARGE PUMP WITH LOW NOISE ON THE WELL OF THE SUBSTRATE

FIELD OF THE INVENTION

This invention relates to a charge pump circuits, and more particularly, to a charge pump circuits with low noise on the well of the substrate on which the charge pump is embodied.

BACKGROUND OF THE INVENTION

In some integrated circuits, e.g. IC memory card with self destruction capability, it is necessary to boost an available power supply voltage to provide a voltage substantially above the conventional 5 volts power supply to destroy the circuits within the IC memory card. The destroyed IC memory card then can not be used further by the illegal holder.

Review of conventional techniques of the charge pump may be found in the Background of the Invention of U.S. Pat. No. 5,392,205 ('205).

In '205, a novel regulated charge pump which finds its best application in a battery-based system is introduced. The '205 is hereinafter referred for all purposes of the prosecution of the instant invention.

However, due to the following reasons, the circuits disclosed in the '205 creates substantial noise on the N-well of the P-substrate on which the charge pump is implemented. During the charging phase, the 153 is ON which makes the node 73 to have value of Vss. During the pumping phase, the 154 is ON which makes node 73 to have value of Vbat. Therefore, as Vbat equals 5.4 volts and Vdd equals 5 volts, the voltage of the capacitor 80 is −0.4 volts. So the voltage of the node 72 varies between 5 and −0.4 volts, and that of the node 73 varies between 5.4 and 0 volts. And as Vbat equals 2.7 volts and Vdd equals 5 volts, the voltage of the capacitor 80 is 2.3 volts. So the voltage of the node 72 varies between 5 and 2.3 volts, and that of the node 73 varies between 2.7 and 0 volts. Due to the parasitic capacitance existing between the P-substrate and the N-well therein, substantial variation mentioned above creates noise over the N-well.

It is, therefore, the main object of the instant invention to provide a charge pump circuits with low noise on the well of the substrate on which the charge pump is embodied.

SUMMARY OF THE INVENTION

A regulated charge pump is provided to minimize the well voltage fluctuation during the operation. The charge pump includes a charge pump core which has a first transistor, a second, a third transistor and an integration circuit.

The charge pump core boosts a first voltage, which exists at a first terminal of a charging capacitor during a first predetermined time period, by an amount equal to a first power supply voltage referenced to a second voltage during a second predetermined time period, and provides a regulated charge pumped voltage in response. The charge pump core includes a first transistor, which has a first current electrode for receiving the first power supply voltage and a second current electrode coupled to the first terminal of the charging capacitor.

The second transistor has a first current electrode coupled to a second terminal of the charging capacitor, a control electrode and a second current electrode for receiving a second power supply voltage. The second transistor is proportionately conductive during the first predetermined time period.

The third transistor has a first current electrode for receiving the first power supply voltage, and a second current electrode coupled to the second terminal of the charging capacitor. The third transistor is conductive during the second predetermined time period.

The integration circuit is coupled to the control electrode of the second transistor, for changing the second voltage proportionately in response to an integration of a difference between a proportional voltage and a reference voltage by altering a conductivity of the second transistor.

DETAILED DESCRIPTION OF THE INVENTION

Figure 1:
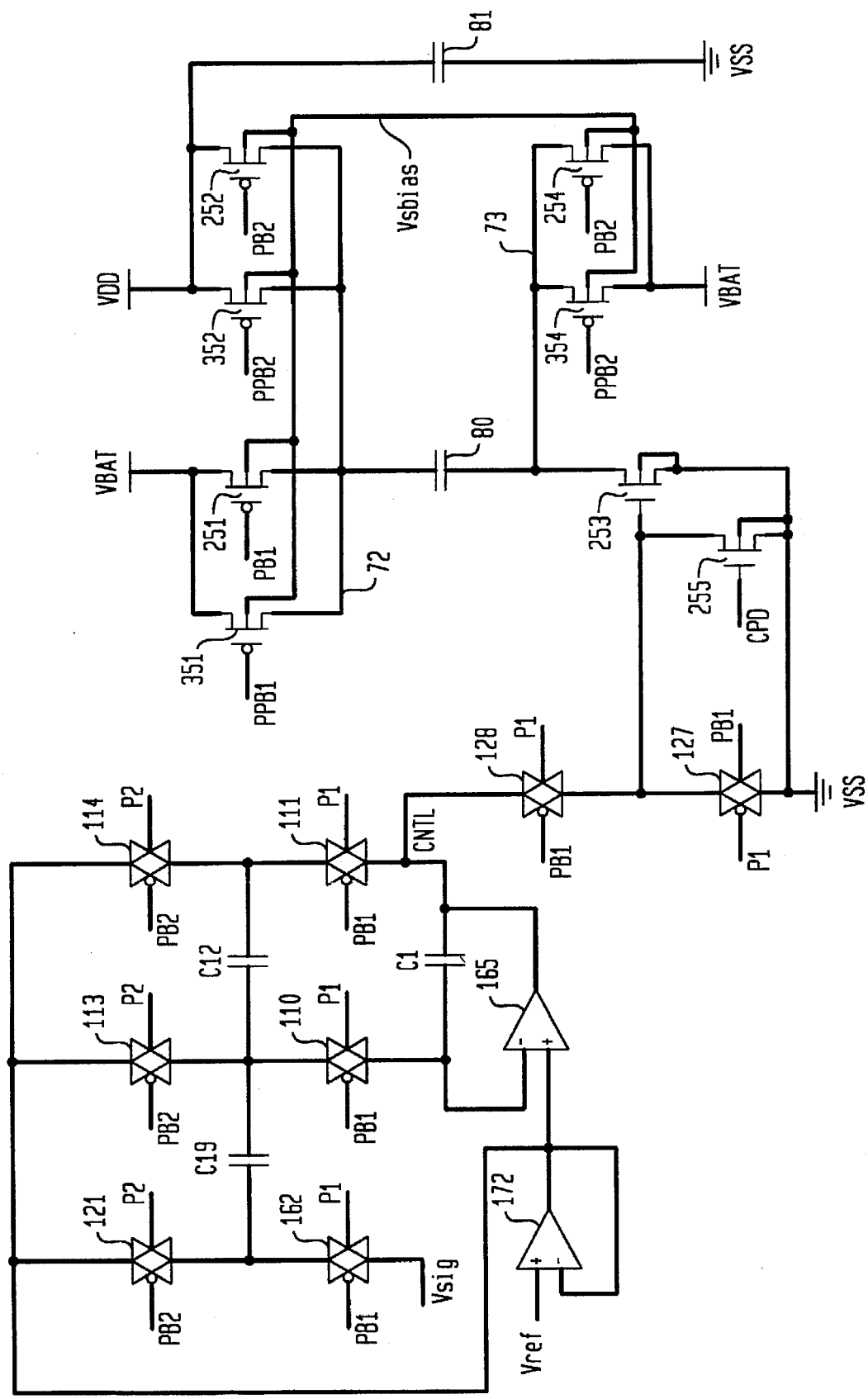
FIG. 1 illustrates the invention in both block and schematic form.

As the conventional one, the regulated charge pump includes a non-overlapping clock generator, a bias circuit, an integration portion and a charge pump core. FIG. 1 shows the portions of regulated charge pump IB according to the invention. Integration portion includes a buffer amplifier 172, transmission gates 114, 111, transmission gates 127, 128, a capacitor C12, a transmission gate 162, a capacitor C19, a transmission gate 110, a capacitor C1, a transmission gate 121, 113 and an amplifier 165. Charge pump core includes capacitor 80, P-channel transistors 251, 252, an N-channel transistor 253, a P-channel transistor 254 and a capacitor 81.

Figure 6:
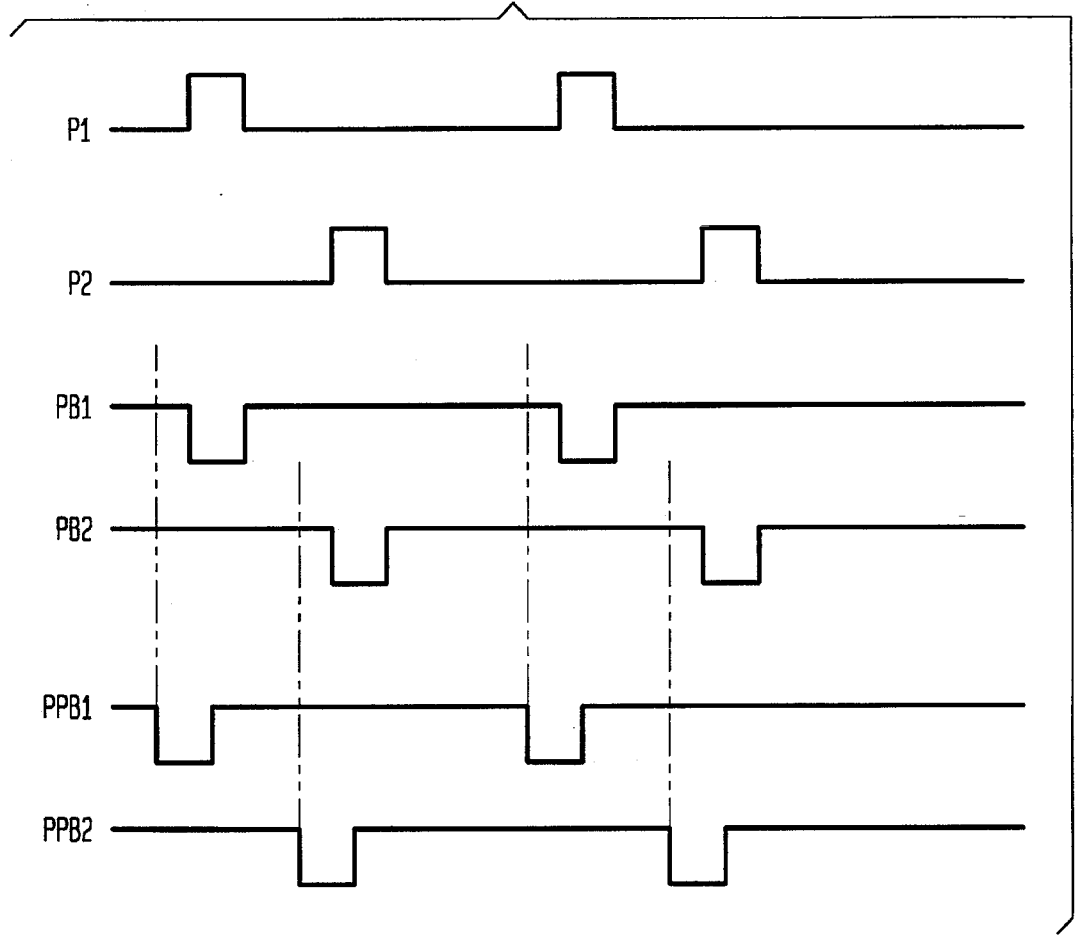
FIG. 6 illustrates the timing relationship of the non-overlapping clocks in FIG. 1.

Non-overlapping clock circuit (not shown) receives signal CLOCK, is coupled to power supply voltages Vbat, Vdd and Vss, and provides, by a well known manner, non-overlapping clock signals pair p1, p2, non-overlapping clock signals pair pb1, pb2, non-overlapping clock signals pair ppb1, ppb2 as shown in FIG. 6, which are level-shifted to Vdd. Signal pb2 is an inversion of the signal p2, signal pb1 is an inversion of the signal p1. P1 signal is used to control specified NMOS transistors in the circuits and is in phase with pb1 signal which is used to control specified PMOS transistors in the circuits. P2 signal is used to control specified NMOS transistors in the circuits and is in phase with pb2 signal which is used to control specified PMOS transistors in the circuits. The ppb1 clock signal leads the pb1 signal and is non-overlapping with respect to pb2 and ppb2 clock signals. The ppb2 clock signal leads the pb2 signal and is non-overlapping with respect to pb1 and ppb1 clock signals. Bias circuit (not shown) is coupled between power supply terminals Vbat and Vss, receives power supply voltage Vdd, and provides, also by a well known manner, an output signal Vsig and an output signal Vsbias. The Vsbias signal operates to bias the well of P-channel transistors in the regulated charge pump. The Vsig signal is used in the integration portion to generate a CNTL signal which will be clear hereinafter.

The integration portion functions to integrate a difference between Vsig and Vref over time. In integration portion, buffer amplifier 172 has a positive input terminal for receiving signal Vref, a negative input terminal, and an output terminal connected to the negative input terminal of buffer amplifier 172. Transmission gate 114 has a first current terminal connected to the output terminal of buffer amplifier 172, a second current terminal, a positive control terminal for receiving signal p2, and a negative control terminal for receiving signal pb2. Transmission gate 111 has a first current terminal connected to the second current terminal of transmission gate 114, a second current terminal for providing signal labelled CNTL, a positive control terminal for receiving signal p1, and a negative control terminal for receiving signal pb1. Transmission gate 128 has a first current terminal for receiving signal CNTL, a second current terminal, a positive control terminal for receiving signal p1, and a negative control terminal for receiving signal pb1. Transmission gate 127 has a first terminal for receiving power supply voltage Vss, a negative control terminal for receiving signal p1, a positive control terminal for receiving signal pb1, and a second terminal connected to the second current terminal of transmission gate 128. Capacitor C12 has a first terminal connected to the second current terminal of transmission gate 114, and a second terminal. Transmission gate 162 has a first current terminal for receiving signal Vsig, a second current terminal, a positive control terminal for receiving signal p1, and a negative control terminal for receiving signal pb1. Capacitor C19 has a first terminal connected to the second current terminal of transmission gate 162, and a second terminal connected to the second terminal of capacitor C12. Transmission gate 110 has a first current terminal connected to the second terminal of capacitors C12 and C19, a second current terminal, a positive control terminal for receiving signal p1, and a negative control terminal for receiving signal pb1. Capacitor C1 has a first terminal connected to the second current terminal of transmission gate 110, and a second terminal connected to the second current terminal of transmission gate 111. Transmission gate 121 has a first current terminal connected to the output terminal of buffer amplifier 172, a second current terminal connected to the second current terminal of transmission gate 162, a positive control terminal for receiving signal p2, and a negative control terminal for receiving signal pb2. Transmission gate 113 has a first current terminal connected to the output terminal of buffer amplifier 172, a second current terminal connected to the second terminal of capacitor C12, C19, a positive control terminal for receiving signal p2, and a negative control terminal for receiving signal pb2. Amplifier 165 has a negative input terminal connected to the second current terminal of transmission gate 110, a positive input terminal connected to the output terminal of buffer amplifier 172, and an output terminal connected to the second current terminal of transmission gate 111 and to the second terminal of capacitor C1.

In charge pump core, transistor 253 has a source connected to Vss, a gate connected to the second current terminal of transmission gate 128, a drain connected to the terminal 73, and a well connected to Vss. Transistor 252 has a first current terminal connected to the drain of transistor 251, a gate for receiving signal pb2, a second current terminal for providing power supply Vdd, and a well receiving signal Vsbias. Transistor 251 has a drain connected to the drain of transistor 252, a gate for receiving signal pb1, a source connected to power supply Vbat, and a well receiving signal Vsbias. Capacitor 80 has a first terminal connected to terminal 72, and a second terminal connected to terminal 73. Transistor 254 has a source connected to power supply voltage Vbat, a gate for receiving pb2, a drain connected to the drain of transistor 253, and a well connected to Vsbias. Capacitor 81 has a first terminal connected to the second current terminal of transistor 252, and a second terminal connected to Vss.

In the charge pump of this invention, NMOS transistor 253 is made conductive or non-conductive proportionately to bring Vdd very close to the desire value, in response to signal CNTL, which is provided by integration portion. During a steady state of the circuits, the voltage across the capacitor 80 is Vdd-Vbat. The voltage of first terminal 72 varies between Vbat and Vdd. During active pb1, the transistor 251 is conductive and couples the first terminal 72 of capacitor 80 to Vbat and, during the same period, the NMOS transistor 253 is conducting or non-conducting due to Vgs=CNTL. During active p1, e.g. active pb1, as the result of operation of the integration portion recited above and the fact of the voltage across the capacitor 80 being Vdd-Vbat, the transistor 253 is in a conductive or non-conductive condition such that terminal 73 of capacitor 80 has voltage equaling to (2Vbat-Vdd). During active pb2, the transistor 254 is conductive and couples the second terminal 73 of capacitor 80 to Vbat and, during the same period, the transistor 252 is conductive and the drain of transistor 252 provides the Vdd. In other words, integration portion gradually adjusts the conductivity of transistor 253 to increase the accuracy of Vdd. The voltage of second terminal 73 varies between Vbat and 2Vbat-Vdd.

Due to the arrangement of the N-channel transistor 253 in the charge pump core, the noise on the well are substantially reduced. That is, as Vbat=5.4 volts and Vdd=5 volts, the steady-state voltage across capacitor 80 is −0.4 volts. Therefore, voltage at node 72 varies between 5.4 and 5 volts, and that at node 73 varies between 5.8 and 5.4 volts. For the same reason, as Vbat=2.7 volts and Vdd=5 volts, the steady state voltage across capacitor 80 is 2.3 volts. Therefore, voltage at node 72 varies between 2.7 and 5 volts, and that at node 73 varies between 0.4 and 2.7 volts. The noise reduction effect for lower Vbat value is less effective than that for higher Vbat value.

It is further understood that while Vbat reaches its minimum, the bias voltage fluctuations, or noise, of P-substrate and N-well in the charge pump circuit are very close to an unexpected level.

Still referring to FIG. 1, the second embodiment of the invention further includes transistors 351, 352 and 354. The connection arrangements of transistor 351, 352 and 354 are same as that of transistors 251, 252 and 254 respectively as shown. However, the gate width of transistor 351, 352 and 354 are respectively fraction of that of transistors 251, 252 and 254. In one embodiment, the fraction may be 1/24. Furthermore, transistor 351, 352 and 354 are respectively gated by control signals ppb1, ppb2. Those smaller PMOS transistors 351, 352 and 354 function to open or close its gate earlier than corresponding action of transistors 251, 252 and 254 respectively. By this arrangement, the well bias current is limited and therefore further minimizes the well bias voltage fluctuation.

Figure 2A:
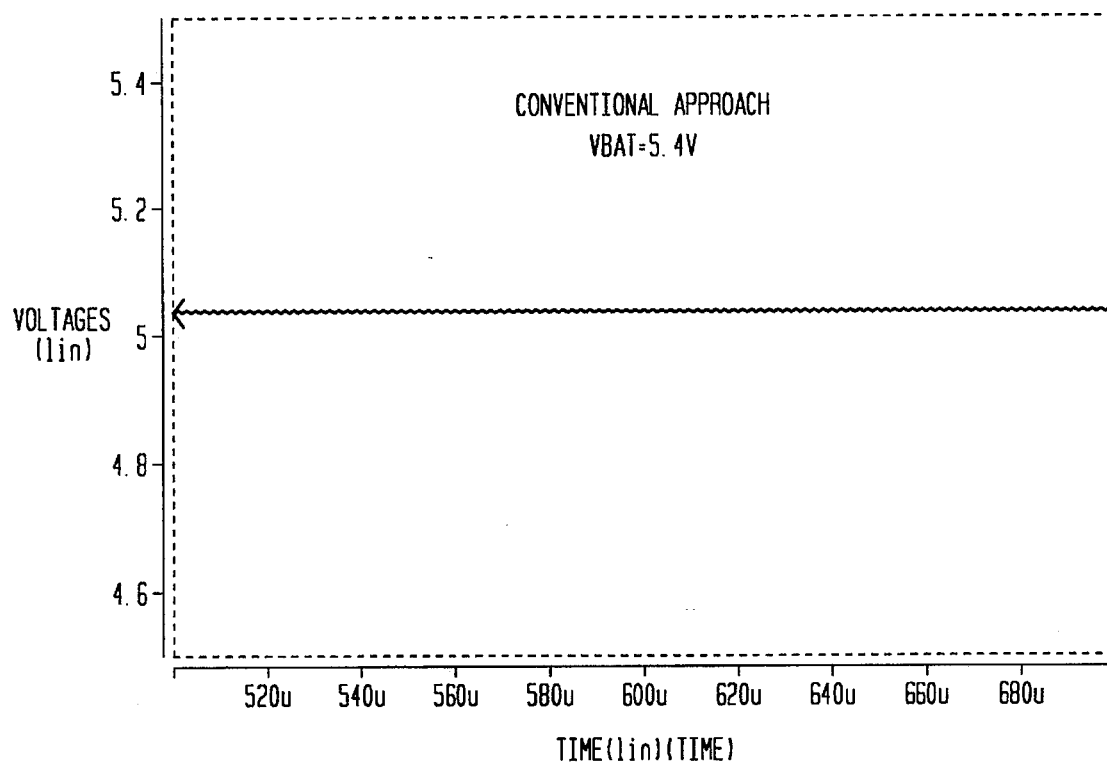
FIG. 2(A) illustrates the charged pump voltage, when the power supply Vbat has a maximum value, in accordance with the conventional approach.
Figure 2B:
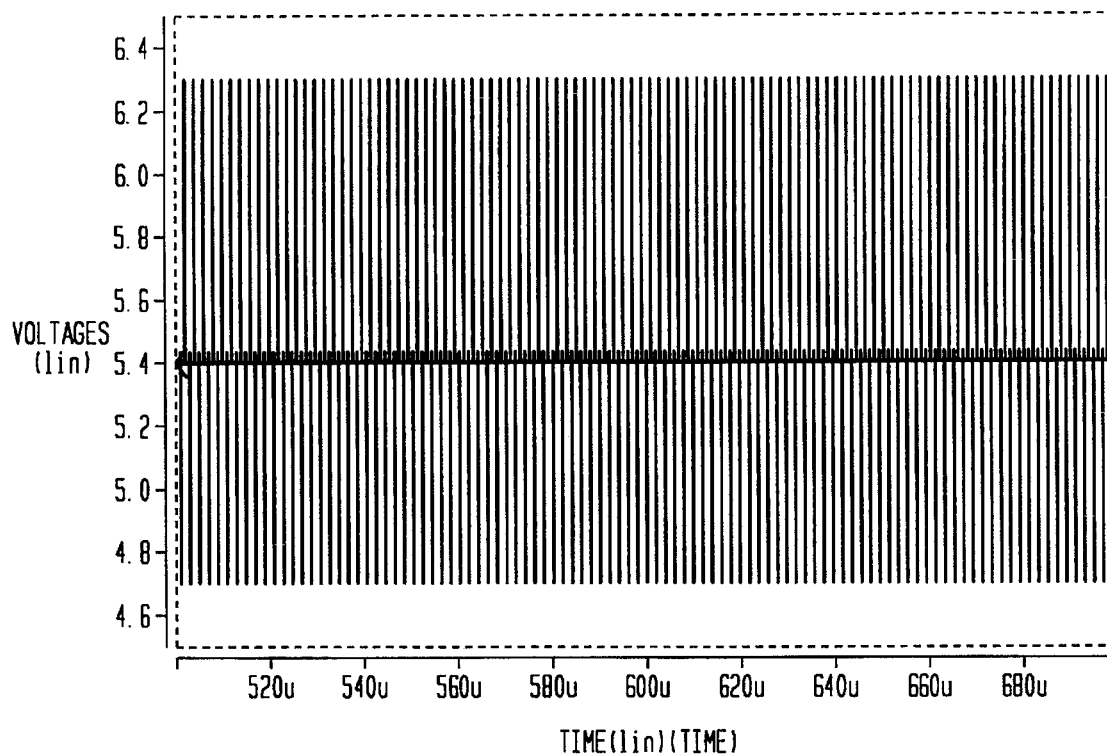
FIG. 2(B) illustrates the well bias voltage fluctuations, when the power supply Vbat has a maximum value, in accordance with the conventional approach.
Figure 3A:
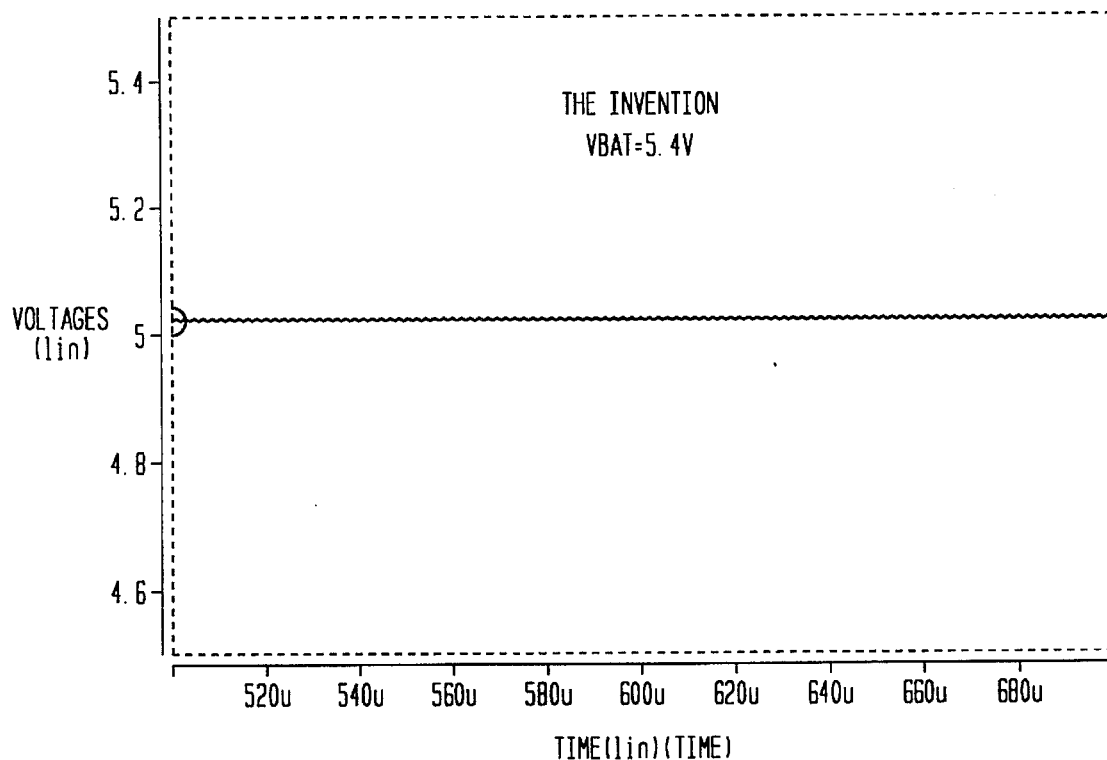
FIG. 3(A) illustrates the charged pump voltage, when the power supply Vbat has a maximum value, in accordance with the invention.
Figure 3B:
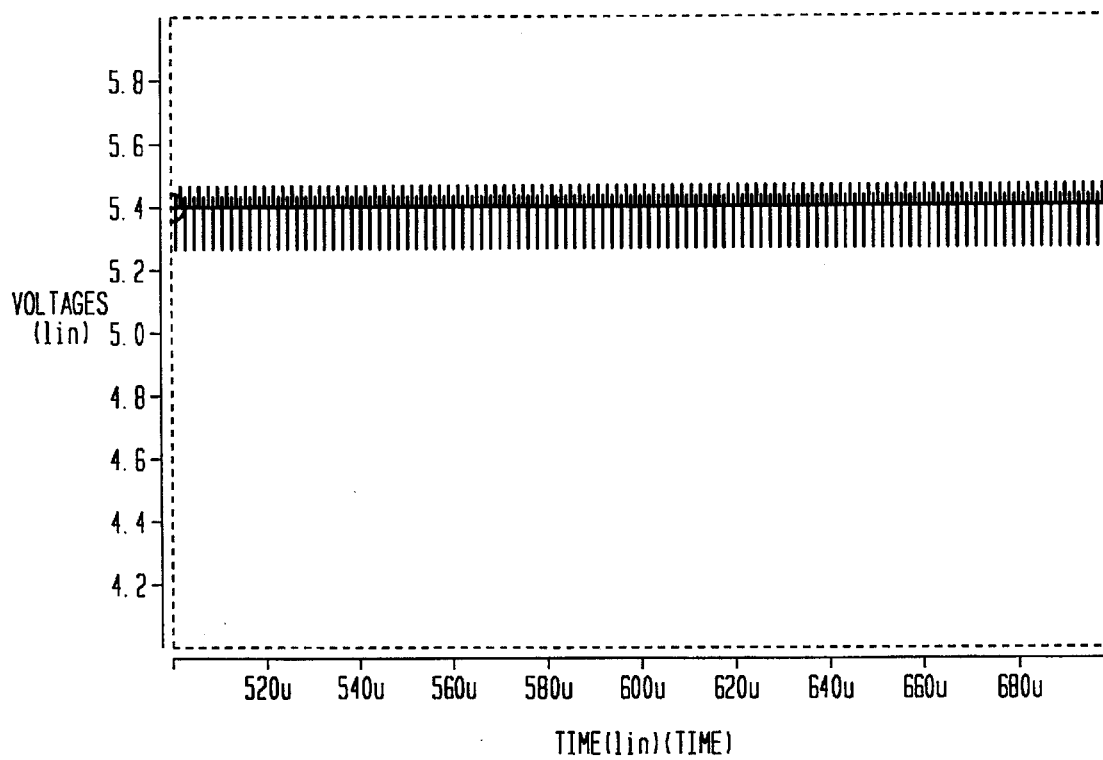
FIG. 3(B) illustrates the well bias voltage fluctuations, when the power supply Vbat has a maximum value, in accordance with the invention.

In FIG. 2(B), when battery voltage Vbat being 5.4 volts, the noise generated on the N-well in accordance with the conventional approach is disclosed. It is obvious the Vsbias fluctuates from almost 6 volts to 4.6 volts. As shown in FIG. 2(A), when battery voltage Vbat being 5.4 volts, the charged pump voltage in accordance with the conventional approach reaches 5.05 volts. In contrast, as shown in FIG. 3(B), the Vsbias of the instant invention fluctuates only from 5.2 volts to 5.4 volts and the charged pump voltage, as shown in FIG. 3(A) reaches 5.05 volts. It is obvious that this invention achieves its object.

Figure 4A:
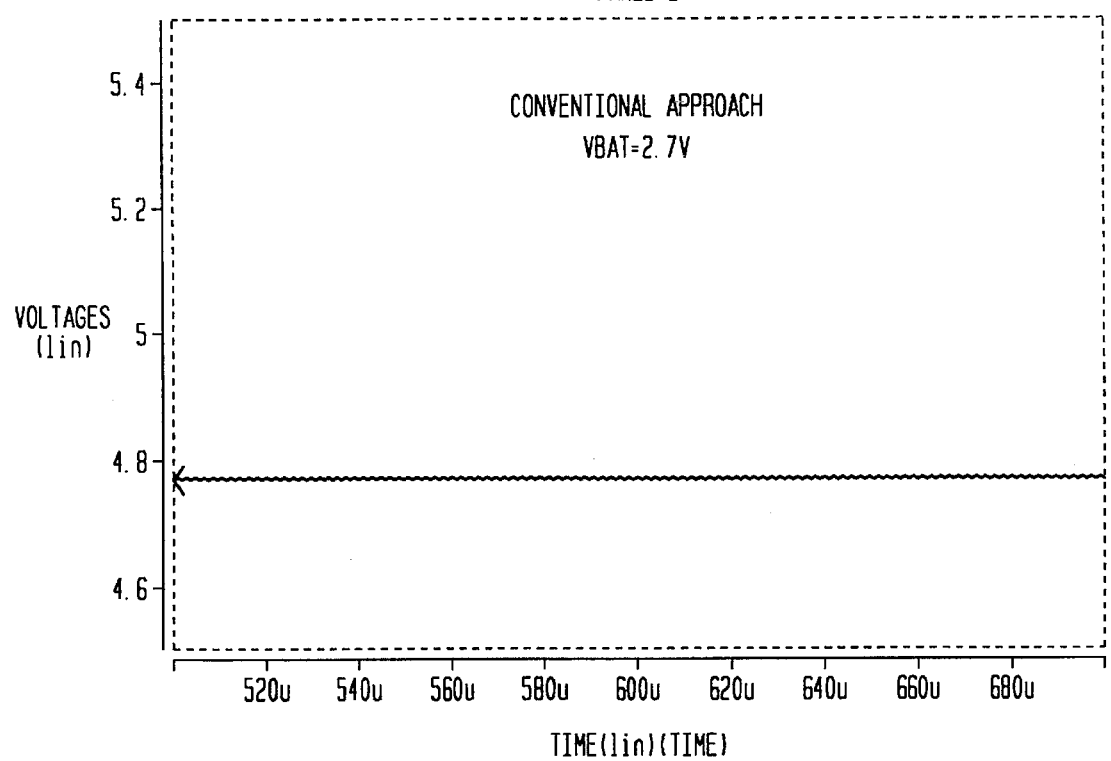
FIG. 4(A) illustrates the charged pump voltage, when the power supply Vbat has a minimum value, in accordance with the conventional approach.
Figure 4B:
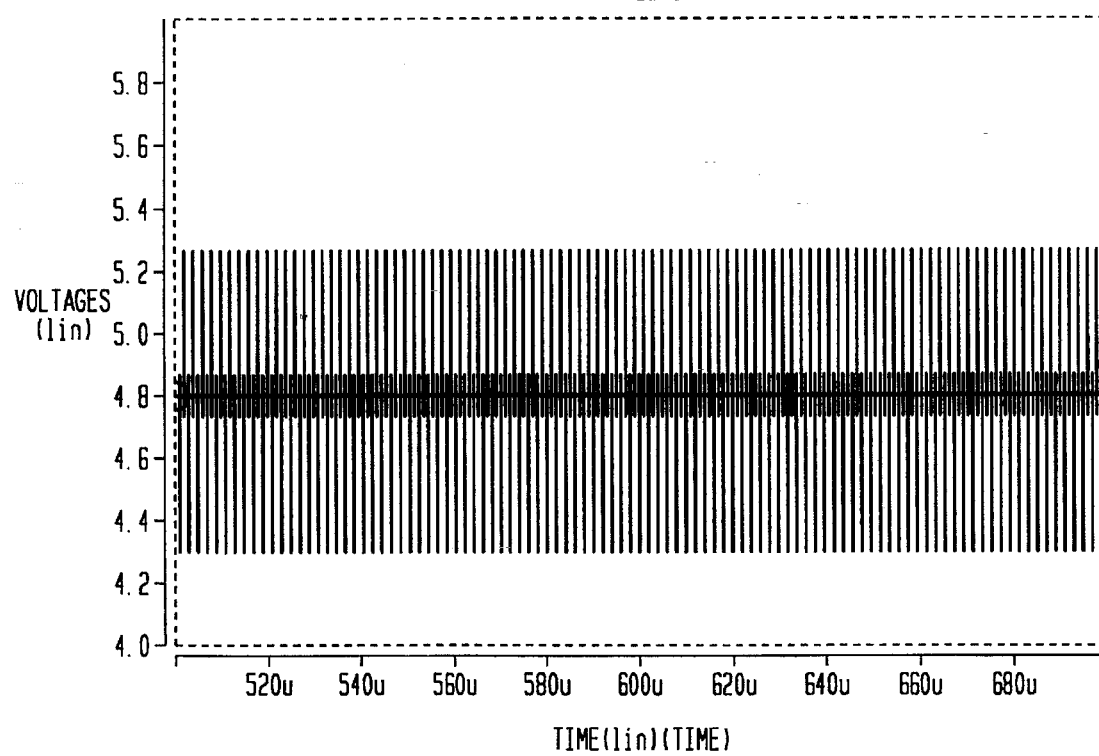
FIG. 4(B) illustrates the well bias voltage fluctuations, when the power supply Vbat has a minimum value, in accordance with the conventional approach.
Figure 5A:
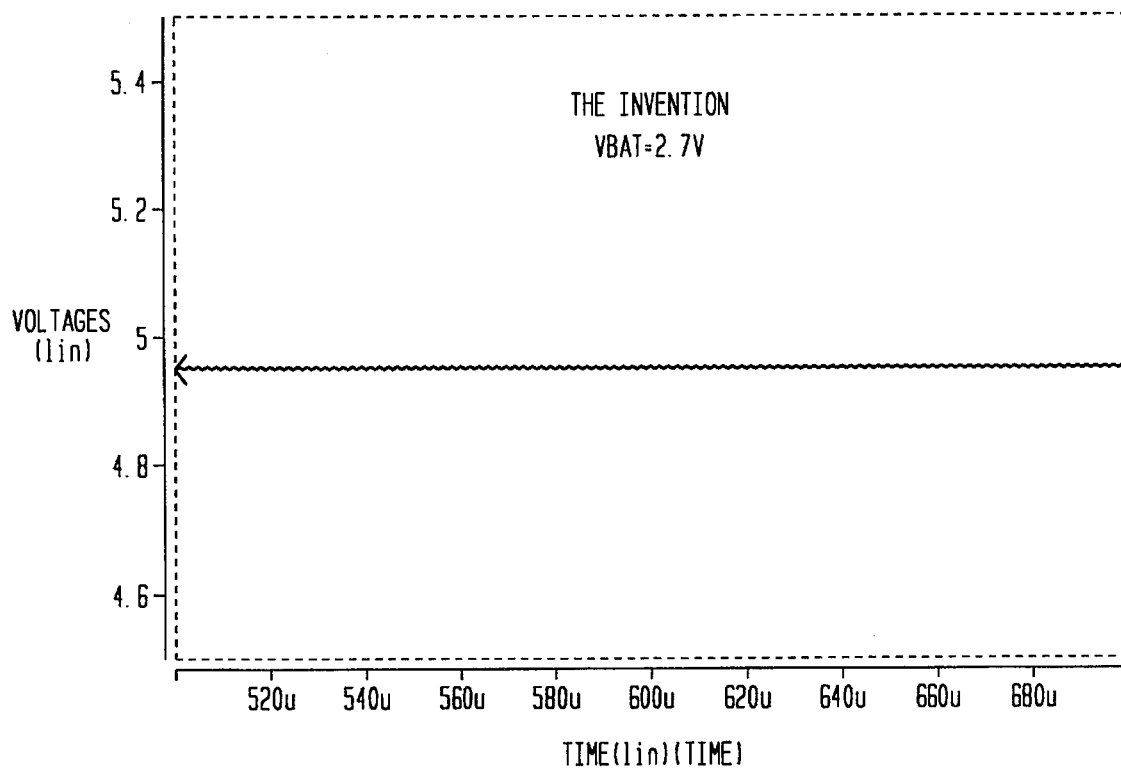
FIG. 5(A) illustrates the charged pump voltage, when the power supply Vbat has a minimum value, in accordance with the invention.
Figure 5B:
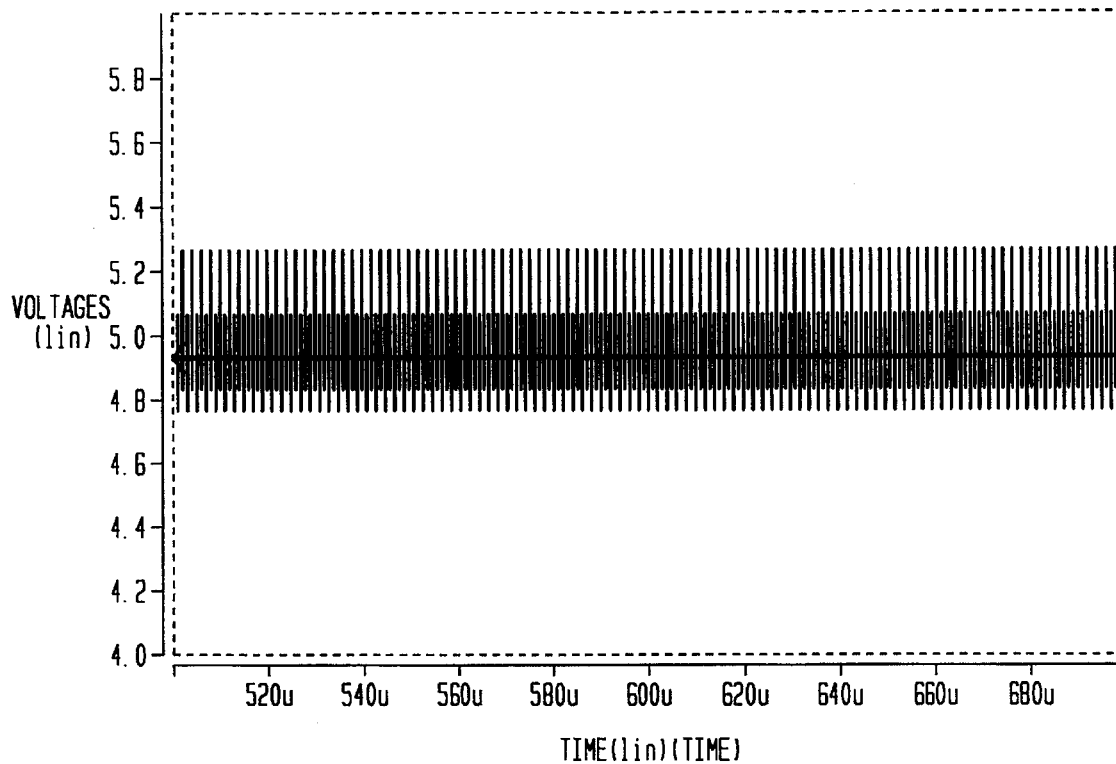
FIG. 5(B) illustrates the well bias voltage fluctuations, when the power supply Vbat has a minimum value, in accordance with the invention.

In FIG. 4(B), when battery voltage Vbat being 2.7 volts, the noise generated on the N-well in accordance with the conventional approach is disclosed. It is obvious the Vsbias fluctuates from almost 5.3 volts to 4.3 volts. As shown in FIG. 4(A), when battery voltage Vbat being 2.7 volts, the charged pump voltage in accordance with the conventional approach reaches 4.8 volts. In contrast, as shown in FIG. 5(B), the Vsbias of the instant invention fluctuates only from 5.2 volts to 4.8 volts and the charged pump voltage, as shown in FIG. 5(A) reaches 4.9 volts. It is obvious that this invention achieves its object.

In FIG. 1, the CPD signal is a power down control signal gating the transistor 255. When the CPD signal is asserted to turn off the transistor 253, the circuit is in power saving mode, the operation of which has nothing to do with the instant invention and will not be disclosed further.

We claim:

1. A regulated charge pump comprising:

a charge pump core for boosting a first voltage, which exists at a first terminal of a charging capacitor during a first predetermined time period, by an amount equal to a first power supply voltage referenced to a second voltage during a second predetermined time period, and providing a regulated charge pumped voltage in response, said charge pump core comprising a first transistor, said first transistor having a first current electrode for receiving said first power supply voltage and a second current electrode coupled to said first terminal of said charging capacitor;

a second transistor having a first current electrode coupled to a second terminal of said charging capacitor, a control electrode and a second current electrode for receiving a second power supply voltage, said second transistor being proportionately conductive during said first predetermined time period; and a third transistor having a first current electrode for receiving said first power supply voltage, and a second current electrode coupled to said second terminal of said charging capacitor, said third transistor being conductive during said second predetermined time period;

an integrating means coupled to said control electrode of said second transistor, for changing said second voltage proportionately in response to an integration of a difference between a proportional voltage and a reference voltage by altering a conductivity of said second transistor.

2. The regulated charge pump as recited in claim 1, further comprising:

a fourth transistor connected to the first transistor in parallel, the fourth transistor being operated to lead the operation of the first transistor;

a fifth transistor connected to the third transistor in parallel, the fifth transistor being operated to lead the operation of the third transistor.

3. The regulated charge pump as recited in claim 1, further comprising:

a holding capacitor having a first terminal for providing said regulated charge pump voltage thereon, and a second terminal for receiving said second power supply voltage;

a fourth transistor for coupling said first terminal of said charging capacitor to said first terminal of said holding capacitor during said second predetermined time period.

4. The regulated charge pump as recited in claim 3, further comprising:

a fifth transistor connected to the sixth transistor in parallel, the fifth transistor being operated to lead the operation of the fourth transistor.

* * * * *